United States Patent [19]
Pan et al.

[11] 3,795,874
[45] Mar. 5, 1974

[54] APPARATUS FOR PUMPING A HIGH PRESSURE LASER SYSTEM

[75] Inventors: Yu-Li Pan, Oakland; Anthony F. Bernhardt, Piedmont; Joe R. Simpson, Dublin, all of Calif.

[73] Assignee: The United States of America as represented by the United States Atomic Energy Commission, Washington, D.C.

[22] Filed: Nov. 3, 1972

[21] Appl. No.: 303,553

[52] U.S. Cl. .............................. 331/94.5, 330/4.3
[51] Int. Cl. .............................................. H01s 3/09
[58] Field of Search ...................... 331/94.5; 330/4.3

[56] References Cited
OTHER PUBLICATIONS

Willett et al., Gas Lasers at Room Pressure, Laser Focus, Vol. 7, (June 1971), pp. 30–34.
Laflamme, Double Discharge Excitation for Atmospheric Pressure Carbon Dioxide Lasers. Rev. Sci. Instr., Vol. 41, No. 11, (Nov. 1970), pp. 1,578–1,581.
Tan et al., A Tea Carbon Dioxide Laser Driven by a 200–KV Mark Generator, Physics Letters, Vol. 38A, No. 4, (Feb. 14, 1972), pp. 225–226.

*Primary Examiner*—William L. Sikes
*Attorney, Agent, or Firm*—John A. Horan; F. A. Robertson; L. E. Carnaham

[57] ABSTRACT

An apparatus for optically pumping a transversely excited, high pressure gaseous laser system by means of a double electrical discharge using a capacitor-bank network and electronic circuitry for implementing the method. Laser energy pulse outputs of approximately 17 Joules/liter at efficiencies of 24% have been obtained by the inventive concept.

8 Claims, 9 Drawing Figures

APPARATUS FOR PUMPING A HIGH PRESSURE LASER SYSTEM

BACKGROUND OF THE INVENTION

The invention described herein was made in the course of, or under, Contract No. W-7405-ENG-48 with the United States Atomic Energy Commission.

This invention relates to double discharge lasers, particularly to a double-discharge, transversely excited, high pressure gas laser system, and more particularly to an apparatus for pumping such a laser system by the utilization of a Marx bank as the voltage source and circuitry for time-shaping the voltage pulse across the anode, cathode, and trigger electrode of the laser, and/or applying voltage to the cathode-trigger independently from the cathode-anode.

The limiting parameter for high-pressure glow discharges in gases at or above static breakeven voltages is the arc-formation time. This is the sum of the statistical and formative time lags. The statistical time lag is the delay required for an initiating electron from any source to appear in the discharge gap while the voltage is being applied. This time lag can be reduced by irradiating the gap with electrons or ultraviolet radiation. Some of the other factors that affect the statistical time delay are discharge volume, electrode surface condition, and profile. The time necessary for the arc discharge to propagate across the gap after the discharge is initiated is called the formative time lag. Depending on the degree of the over-voltage across the gap, the formative time lag can vary from less than $10^{-7}$ seconds to more than $10^{-4}$ seconds. For air at atmospheric pressure, the formative time is approximately $10^{-8}$ seconds for plane electrodes 0.2 cm apart at 50 percent over-voltage. The statistical time lag in this case is about $10^{-7}$ seconds.

Glow-discharge can be obtained in any gas between two electrodes by making the discharge time short compared to the arc formation time or by limiting the discharge current density enough to prevent the formation of a constricted arc. All the known transversely excited atmospheric pressure (TEA) $CO_2$ laser techniques operate on one or both of these principles.

To operate a system in the short discharge regime, it is necessary to have a very low-inductance electrical circuit, fast switching, good electrode surface condition and design, e.g., Rogowski profile described in Arch. Elektrotech 12, 1 (1923). To delay the arc formation as long as possible, the electrodes must be uniformly spaced and well polished to eliminate burrs. Furthermore, it has been found that the fast discharge time does not correspond to the most efficient pumping rate for $CO_2$ lasers. Thus, in addition to the difficulties mentioned above, the efficiency of these devices can be expected to be lower than those operating in the long discharge-time regime.

The discharge-current density can be limited by either constraining the total current flow or by maximizing the discharge area. A row of 1,000 ohm resistors to limit the discharge current in a pin-to-bar electrode configuration to pump a TEA $CO_2$ laser, see article by A. J. Beaulieu, Applied Physics Letters 16, 504 (1970). Since the shape of a pin-bar discharge is approximately conical, the current density in this volume cannot be constant. The pumping efficiency, therefore, will vary as a function of position. In addition, because of the energy loss in the resistors, the efficiency is low.

To enlarge the discharge area, other researches, see article by Lamberton et al, Electronics Letters 7, 141 (1971), have applied the idea of ultraviolet illumination from a nearby arc to initiate the uniform discharge between two electrodes in a TEA $CO_2$ laser, by placing a fine wire near two electrodes, shaped like the above-referenced Rogowski's electrode, with the arc discharge being initiated between the wire and the anode to generate the necessary ultraviolet radiation to trigger the glow discharge between the main electrodes. Since the duration of the ultraviolet radiation is short and the intensity low, the main discharge cannot be expected to operate in the glow discharge regime for an extended period, more than a few hundred nanoseconds. Thus, this type of device therefor inherits the disadvantages of the systems that operate in the short-discharge-time regime.

The use of a corona discharge to trigger the breakdown of a gap was first studied by Wynn-Williams, Phil. Mag. 1, 353 (1926). This idea has been independently applied by Laflamme, Review of Scientific Instruments 41, 578 (1970), and by Dumanchin et al, Laser Focus 7, 32 (Aug. 1971), to maximize the uniform discharge area in TEA $CO_2$ lasers. Trigger discharges were used to generate a uniform ionization layer near the cathode before the onset of the main discharge, a low inductance pulse transformer electronic system being utilized as the voltage source.

SUMMARY OF THE INVENTION

The present invention is directed to a double-discharge laser generally similar in electrode geometry to that of the above-referenced Dumanchin et al device but differing in the voltage source and electronic circuitry. The present invention utilizes a Marx bank (capacitor-bank network) as the voltage source and electric circuitry for time-shaping the voltage pulse across the anode, cathode, and trigger electrode of the laser instead of the low inductance pulse transformer electronic system of the prior device, thereby substantially increasing the efficiency over the prior art double-discharge laser systems. In addition the invention provides circuitry for applying voltage to the cathode-trigger independently from the cathode-anode. For example, laser energy pulse outputs of approximately 17 Joules/liter at efficiencies of 24 percent have been reliably obtained with the inventive system, compared to a maximum 17 percent efficiency of the prior known system.

Therefore, it is an object of this invention to provide a double-discharge, transversely excited, high pressure gas laser system.

A further object of the invention is to provide a double-discharge laser system which utilizes a capacitor discharge power supply and electronic circuitry for shaping the voltage pulse.

Another object of the invention is to provide a double-discharge, high pressure gas laser system producing very high energy laser pulses at high efficiencies.

Other objects of the invention will become readily apparent from the following description and accompanying drawings.

DESCRIPTION OF THE INVENTION

In $CO_2$ lasers, as pointed out above, population inversion (pumping) is accomplished by glow discharge. Ultraviolet illumination, electron-beam ionization, and corona discharge have been used to create the initial charges needed to trigger glow discharges in $CO_2$ lasers. While the ultraviolet-illumination (UV) technique is simple and compact, the applicability of such to large systems is questionable because of the difficulties involved in producing intense UV radiation for extended periods. The electron-beam technique allows great flexibility in the density of the trigger electrons and in the discharge duration, but these advantages must be balanced out with the complexity associated with the use of an electron-beam gun. The corona-discharge initiation, utilized in this invention, has some of the advantages of the UV and electron-beam initiation techniques without the associated limitations and complexities.

A transversely excited atmospheric pressure double-discharge laser utilizes three electrodes with two different discharges taking place in the three-electrode system, and thus is referred to as a double-discharge TEA $CO_2$ laser. Prior to the present invention, the only successful double-discharge laser had been driven by a transformer, as pointed out above. Driving the laser directly with a single-capacitor or Marx bank provides a superior method which is simpler, more flexible, and more efficient than transformers. In addition to the low inductance and small energy leakage, the Marx bank system does not have to deal with the hysteresis effect in the transformer's iron core, which is necessary to insure high coupling coefficient and lower energy leakage. Combining the Marx bank power supply with circuitry for time-shaping the voltage pulse impressed across the cathode, anode, and trigger electrodes provide a substantial advance in the double-discharge laser systems by providing reliable operation at high output energies over a large volume.

Figure 1:
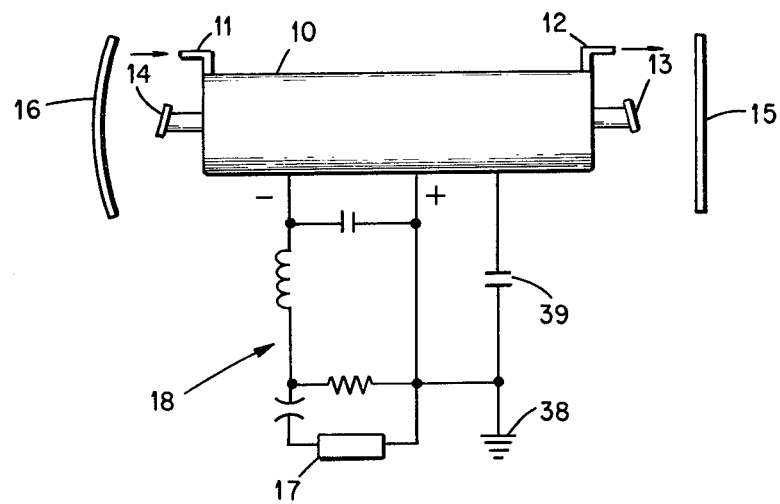
FIG. 1 schematically illustrates an embodiment of a double-discharge TEA CO₂ laser utilizing a Marx bank power supply and time-shaping circuitry.

Referring now to the drawings, FIG. 1 schematically illustrates an embodiment of a double-discharge TEA laser which comprises a discharge tube or vessel 10 containing a gaseous lasing medium such as a mixture of helium, carbon dioxide, and nitrogen gases which are supplied from separate supply tanks and mixed prior to being introduced into vessel 10 via a gas inlet 11 and discharged therefrom via a gas outlet 12. Vessel 10 is provided with windows 13 and 14 positioned at the Brewster angle, and made of NaCl, for example. Positioned in spaced relation with respect to window 13 is a reflective member 15, such as a partially (50–60 percent) reflecting flat germanium output mirror, while a reflective member 16, such as a gold, 100 percent reflecting mirror with a 5–10 m radius of curvature, is positioned in spaced relation with respect to window 14, thereby defining an optical resonant cavity. The electrical system generally comprises a Marx bank or capacitor discharge power supply 17 connected via electronic circuitry generally indicated at 18 to the electrode structure, consisting of cathode means, anode means and trigger electrode means, within vessel 10, as described with respect to FIGS. 2–4, the circuitry 18 being described in detail with respect to FIGS. 7–9, with a more detailed description of the Marx bank 17 being set forth with respect to FIGS. 5 and 6. While the FIG. 1 embodiment is illustrated in an oscillator configuration, it can be utilized as efficiently in an amplifier configuration as known in the art.

Figure 2:
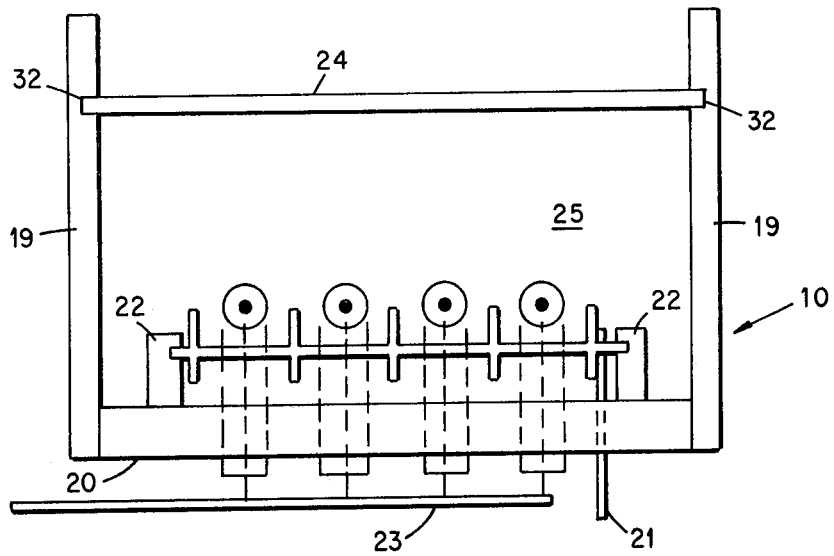
FIG. 2 diagrammatically illustrates the electrode geometry of the FIG. 1 embodiment.
Figure 3:
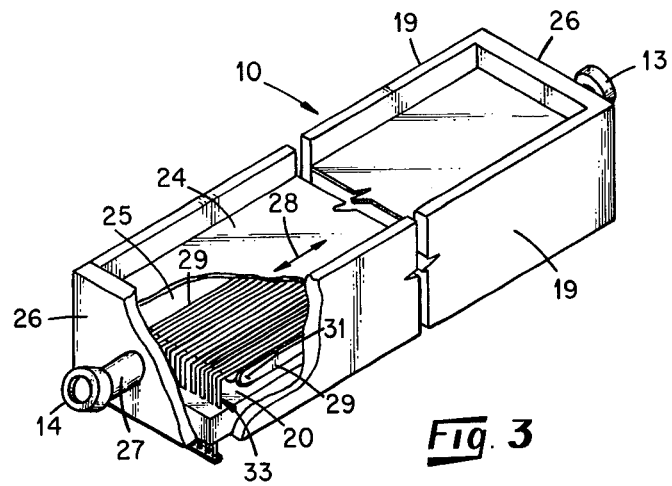
FIG. 3 is a perspective view, with portions removed of a double-discharge laser illustrating a structural embodiment of the FIG. 1 double-discharge laser.
Figure 4:
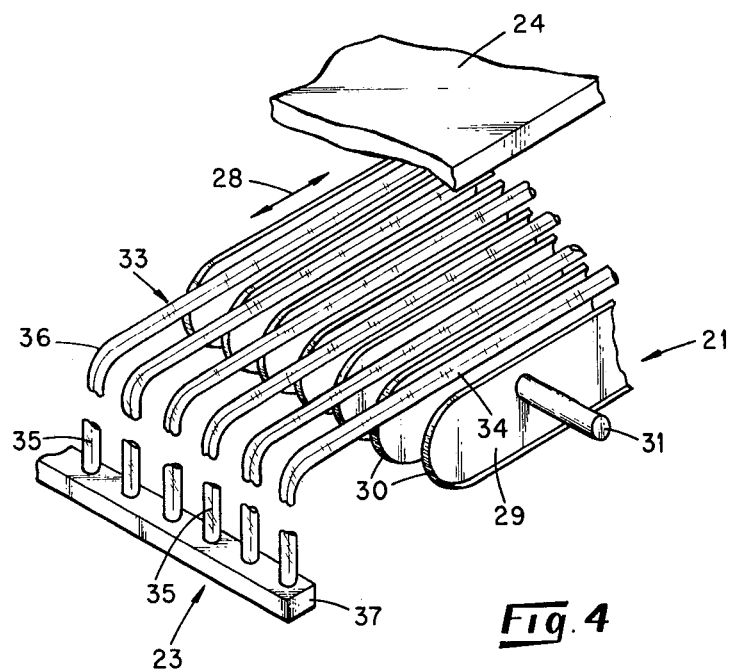
FIG. 4 is an enlarged view of a portion of the FIG. 3 electrode structure.

FIG. 2 diagrammatically illustrates the electrode structure of the FIG. 1 double-discharge laser, while FIGS. 3 and 4 show a structural embodiment thereof. As seen in FIG. 2, the vessel 10 includes wall or side sections 19 and bottom or plate member 20, constructed of material such as acrylic Lucite. A cathode assembly generally indicated at 21 is mounted in spaced relation with bottom member 20 on supports 22. A trigger electrode assembly generally indicated at 23 extends through bottom member 20 and adjacent the cathode assembly 21, as described in greater detail hereinafter with respect to FIGS. 3 and 4. An anode 24 is mounted in spaced relation with respect to cathode assembly 21 and secured in wall sections 19 of vessel 10 forming the top or closure member defining in vessel 10 a chamber or gas enclosure 25 which contains the gaseous lasing media.

Referring now to the mechanical construction details of an embodiment of the double-discharge laser, as shown in FIGS. 3 and 4, vessel 10 additionally includes end sections 26 having portholes in which are mounted tube-like members 27, the outer end of which are secured the Brewster angle windows 13 and 14, defining an optical path indicated by the double arrow 28. The cathode assembly 21, in this embodiment, consists of 21 0.039 cm thick aluminum alloy strips 29 milled to 1.8 cm wide and 92 cm long. The ends 30 of strips 29 are semicircular, with a radius of 0.9 cm. Care is taken to ensure a smooth transition between the straight and semicircular sections of the strips 29. The strips 29 are held together near both ends (only one shown) and at the middle (not shown) by 0.316 cm diameter aluminum tie rods 31. Ring spacers (not shown) with 0.316 cm i.d., 0.633 cm o.d., and 0.600 ± 0.002 cm thickness are placed on the tie rods 31 intermediate the strips 29 to keep the strips about 6 mm apart. The strips 29 are assembled such that the top edges are coplanar and the tie rods 31 supported in members 22 (see FIG. 2).

The gas enclosure or chamber 25 in the FIG. 3 embodiment is 17 cm wide and 106 cm long, with the side wall sections 19 of vessel 10 being 1.9 cm thick, the bottom member 20 being 3.175 cm thick, and the end sections 26 being 2.53 cm thick Lucite. The portholes in which tube-like members 27 are mounted have a diameter of 3.16 cm. No effort was taken to make the chamber 25 vacuum tight since the lasing medium is at atmospheric pressure. Slots 32 (see FIG. 2), 0.4 cm by 0.4 cm, were cut along the full length of the side wall sections 19 of the vessel 10 to support the anode 24, nylon screws via holes in wall sections 19 (not shown) secure the anode in slots 32.

The anode 24 in the FIG. 3 embodiment comprises an aluminum plate 17.8 cm wide, 0.316 cm thick, and 106 cm long and is positioned such that the side (inner side) facing the cathode assembly 21 is 5 cm from the top of the cathode strips 29. All of the edges of the anode 24 are rounded to prevent large field gradients. Care was taken in cutting the slots 32 on the side walls 19, tapping holes for the nylon screws, and constructing the cathode assembly supports 22 so that the height variation in the 5 cm discharge gap between anode and cathode is not more than 0.01 cm.

The trigger electrode assembly 23 comprises, in the FIG. 3 embodiment, twenty trigger electrodes 33, each made from 5-6 mm Pyrex capillary glass tubes 34 through which Nichrome wires 35 extend. The outside diameter of the capillary tubes 34 varied between 0.550 and 0.560 cm. The tubes 34 were sealed at one end (not shown) and include a 90° bend 36 near the open other end. The distance from the sealed end to the 90° bend 36 is $100 \pm 0.5$ cm and $10 \pm 0.5$ cm from the bend 36 to the open end. The tubes 34 are supported and clamped near the sealed end and near the bend 36, by means not shown and are each positioned intermediate a pair of cathode strips 29 so that the 0.025 cm Nichrome wires 35 are at the same level as the top edge of the aluminum cathode strips 29. It is important to have the glass tubes 34 tightly secured since they vibrate during the discharge. Since the tubes 34 tend to sag, small plastic blocks (not shown) are placed near the center to support them. The Nichrome wires 35 are clamped to a copper bus bar 37 which is connected to ground indicated at 38 through a 6,000 pF capacitor 39, as generally illustrated in FIG. 1 and described hereinafter with respect to FIG. 7.

As pointed out above, a gaseous lasing media such as helium, carbon dioxide, and nitrogen gases (He/-$CO_2/N_2$), in a ratio of 5:1:1, which come from separate supply tanks are mixed in a flow meter mixer, not shown, before being introduced into the gas enclosure or chamber 25.

Figure 5:
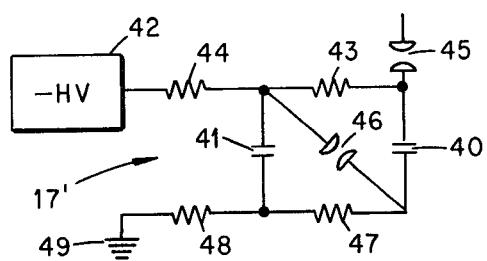
FIGS. 5 and 6 schematically illustrate embodiments of the Marx bank power supplies of FIGS. 6 and 7.
Figure 6:
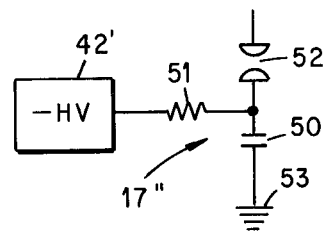

The electrical construction embodiments of the Marx bank 17 of FIG. 1 are illustrated in FIGS. 5 and 6. In the FIG. 5 embodiment the Marx bank 17' is constructed in a coaxial configuration with two 30 kV, 0.5 $\mu$F capacitors 40 and 41. Each capacitor has an internal inductance of 0.05 $\mu$H, and all the connections in the Marx bank embodiments are made with 7.5 cm wide copper sheets. The inductance of the Marx bank 17' as a whole is approximately 0.2 $\mu$H. The capacitors 40 and 41 are charged by an unregulated negative high voltage (30 kV, for example) power supply 42 via 10 Meg resistors 43 and 44, and two trigger spark gap assemblies 45 and 46 are used to switch the stored energy. Capacitors 40 and 41 are connected via 10 Meg resistors 47 and 48 to ground indicated at 49.

The capacitor bank 17'' illustrated in FIG. 6 comprises a single 60 kV, 0.25 $\mu$F capacitor 50 charged by a negative high voltage (−HV) power supply 42' via a 10 Meg resistor 51, and provided with a trigger spark gap 52, while being connected to ground as indicated at 53. Thus, the energy source for the laser may be a capacitor network as in FIG. 5 or a single capacitor as in FIG. 6.

In the embodiment of the invention as illustrated, the capacitance between the cathode assembly 21 and the Nichrome wires 35 was measured to be $560 \pm 7$ pF, while a capacitance of $70 \pm 5$ pF was measured between the cathode assembly 21 and anode 24.

During testing of the invention, the high voltage was measured with a 1,000:1 resistive divider made from carbon resistors. The currents were measured by two current-viewing resistors. A liquid-nitrogen-cooled, gold-doped Ge detector was used to detect the pulse shape of the 10.6 $\mu$ laser radiation. All the signals were displayed on an oscilloscope. The energy output was measured by a ballistic thermopile coupled to an energy meter and a chart recorder.

Figure 7:
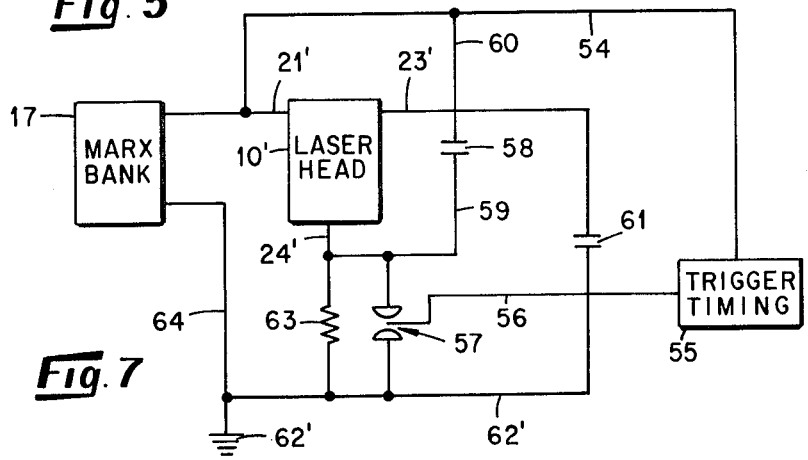
FIG. 7 schematically illustrates circuitry utilized to delay application of voltage between cathode and anode with respect to application of voltage between cathode and trigger.

FIG. 7 illustrates a circuit used in the rise time measurements conducted on the inventive concept, wherein a high voltage was impressed on the trigger discharge and the main discharge at different times. The circuitry is connected to a laser head or vessel 10' having a cathode assembly lead 21', a trigger assembly lead 23', and an anode lead 24'. Cathode lead 21' is connected to a Marx bank 17 and via an electrical lead 54 to a trigger timing mechanism 55 which in turn is electrically connected via lead 56 to a spark gap assembly 57. A first capacitor 58 is mounted via leads 59 and 60 intermediate anode lead 24' and lead 54, while a second, but smaller capacitor 61 is mounted between trigger lead 23' and a lead 62 connected to ground as indicated at 62', one leg of spark gap 57 being connected to lead 59 with the other leg connected to ground lead 62. Anode lead 24' is connected via a resistor 63 to ground lead 62 while Marx bank 17 is connected via lead 64 to ground lead 62. Thus by the addition of the trigger timing mechanism 55 and the spark gap assembly 57 high voltage from Marx bank 17 was impressed on the trigger discharge (between trigger assembly 23 and cathode assembly 21) and the main discharge (between cathode assembly 21 and anode 24) at different times. In these rise time measurement tests it was determined that the best operation was obtained when the main discharge was initiated approximately 2 $\mu$sec after the trigger discharge.

The trigger discharge depends on the corona discharge from the sharp edges of the cathode strips 29. The corona current depends upon the curvature of the edges and the proximity of the glass tubes. The corona current from the cathode assembly has been determined by calculations. At 60 kV an average corona current of 36.6A is obtainable, and using the measured capacitance of 560 pF between the cathode and trigger wires 35, a charging time of 0.9 $\mu$sec is obtained. Similarly, an average current of 12.8A and a charging time of approximately 1.3 $\mu$sec is obtained at 30 kV. When the finite high voltage rise time and losses are taken into account, a charging time of approximately 2 $\mu$sec is obtained. Thus, the 2 $\mu$sec measurement corresponds to the calculated time necessary to allow the trigger discharge to build up to the maximum pre-ionization charge density that the circuit allows.

If the circuit does not contain spark gaps external to the Marx bank (spark gap 57), then a delay time must be introduced by other means. For example, in the circuits described hereinafter with respect to FIGS. 8 and 9, the voltage rise is regulated by the LC values. The optimum rise time was also found to be approximately 2 $\mu$sec under a wide range of operating conditions.

Once the pre-ionizing charges are dissipated, arc formation follows. It is therefore imperative that the high voltage be reduced below the breakdown voltage shortly after the peak of the main current pulse. However, the glow discharge should be maintained as long as possible, since more laser output results from the longer pumping time. Thus, for best operation, the high voltage should be brought down enough that no arcing occurs and at the same time be high enough to extend the pumping time.

In the course of testing to verify the invention, the double-discharge laser was operated with numerous different circuits containing resistors, capacitors, inductors, and spark gaps. Circuits containing spark gaps external to the Marx bank, as illustrated by the FIG. 7 embodiment, that were programmed to fire at a predetermined time were found to be sensitive to changes in operating conditions, and thus this circuit was found to be not as effective as, for example, the types illustrated in FIGS. 8 and 9. While the FIG. 7 circuit showed this sensitivity, this need not be the case for all independent firing circuits.

It is important to note that although the rise and fall time criteria were followed in the testing efforts, some circuits did not give the expected performance. The parameter that was varied with these circuits was the slope of the high voltage pulse near the beginning. When the voltage pulse rose rapidly, a sharp current pulse was observed, with a full width at the base of less than 0.5 $\mu$sec, in the trigger discharge and no main discharge current until arcing occurred. Even when the arcing in the main gap occurred several microseconds after the start of the voltage pulse, no corona current was observed in the trigger gap after the initial spike. The performance of the double-discharge laser improved when the initial slope of the voltage pulse was decreased. In that case, a slow-rising trigger discharge current was observed, which continued for about 2 $\mu$sec without the initial spike, and a large main discharge current. Thus, in addition to the rise and fall time requirements, the initial slope of the high-voltage pulse must be kept small.

Figure 8:
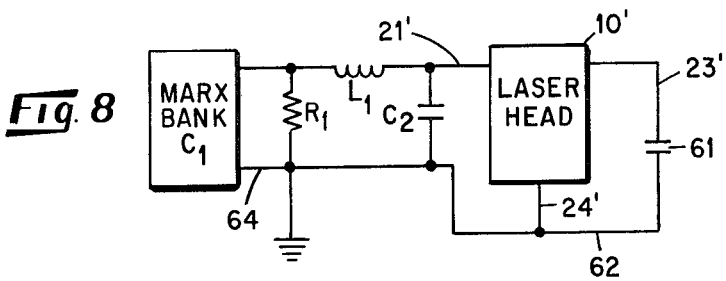
FIGS. 8 and 9 schematically illustrate other embodiments of the electronic circuitry in accordance with the invention.
Figure 9:
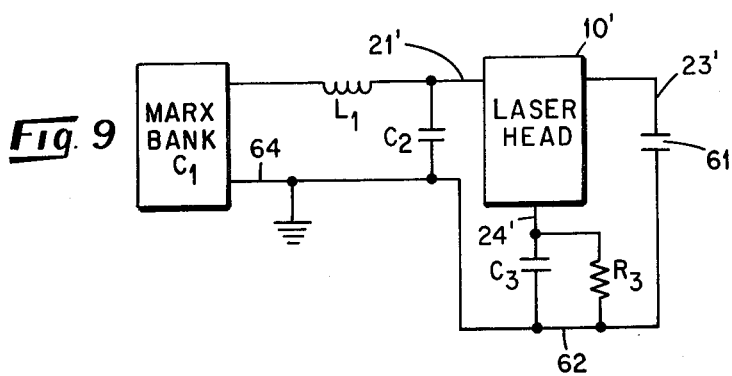

A uniform glow discharge over the entire 5×12×92 cm discharge volume of the FIG. 3 embodiment was obtained with the circuits of FIGS. 8 and 9. These circuits gave reliable performance under all operating conditions.

Referring now to the FIG. 8 embodiment, a laser cavity or head 10' containing a gaseous lasing media provided as in the FIG. 7 embodiment with a cathode lead 21', a trigger lead 23' and an anode lead 24', cathode lead 21' being connected to a Marx bank $C_1$ via an inductance coil $L_1$; trigger lead 23' being connected through a capacitor 61, such as a 6,000 pF type, to ground via lead 62; and anode lead 24' being connected directly to ground lead 62, with Marx bank $C_1$ being connected to ground via lead 64. A capacitor $C_2$ is connected on one side to cathode lead 21' intermediate inductance coil $L_1$ and laser head 10', and on the other side to ground lead 62, while a resistor $R_1$ is connected at one side intermediate inductance coil $L_1$ and Marx bank $C_1$ and on the other side to ground lead 62.

The FIG. 9 embodiment is generally similar to that of FIG. 8 except resistor $R_1$ has been eliminated and a capacitor $C_3$ positioned in anode lead 24' with a resistor $R_3$ connected on one side to anode lead 24 intermediate capacitor $C_3$ and laser head 10', and on the other side to ground lead 62. The Marx bank $C_1$ in FIGS. 8 and 9 may be constructed, for example, as illustrated in FIGS. 5 and 6.

The value of the $L_1C_2$ combination, as mentioned above, is chosen to give approximately 2 $\mu$sec of rise time. For example, $L_1$ is 15 $\mu$H and $C_2$ is 0.05 $\mu$F. Changing $L_1$ and $C_2$ showed that a 25 percent variation in the rise time did not significantly affect the operation. Also, the location of the inductor $L_1$ is important. When it is placed too close the laser cavity, the high magnetic field can introduce distortions in the electric field and cause arcing.

$R_1$ and $C_3R_3$ are chosen so that the time constants for $C_1R_1$ and $C_3R_3$ are approximately 10 $\mu$sec. This ensured the proper drop in the high voltage discussed earlier. It was found that the high voltage across the main gap (cathode-anode) must be reduced to and kept below approximately 25 kV shortly after the peak of the current pulse. This caused a low discharge current to flow across the main gap for several more microseconds. This current flow has, in some cases, increased the laser output by approximately 50 percent.

In the tests conducted, the best operation was obtained utilizing the FIG. 8 circuit with resistor $R_1 = 40$ $\Omega$. When $R_1$ was increased above this value by about 25 percent, the system frequently arced. On the other hand, when the resistor value was decreased, the laser energy output efficiency dropped. It should be noted that, in the FIG. 8 circuit with the above given values, even relatively severe electrode damages did not produce arcing. While testing of the FIG. 9 circuit has not, at this time, been as extensive as on the FIG. 8 embodiment, the tests thus far conducted indicate that this circuit will perform even more efficiently.

Using the circuit of FIG. 8, the disclosed double-discharge laser has been operated with He/$CO_2$/$N_2$ gaseous lasing mixtures in ratio ranging from 10:1:1 to 3:1:1, respectively, at voltages between 45 and 64 kV. In all cases, air sparks inside the thermopile cone was obtained. A typical laser output of about 17 J/liter was obtained which is equivalent to an efficiency of 24 percent. The best energy output per unit volume and the corresponding efficiency of the prior known double-discharge laser systems varied from 5.49 to 18 J/liter and 4.5 to 17.4 percent efficiency, thus present invention has provided a substantial advance in the energy output per unit volume and the corresponding efficiency. With the present invention, the pulse-to-pulse variation in the output energy was less than 10 percent, which is due partly to the voltage variation in the unregulated power supply used in the testing. The best performance of the inventive system, in an oscillator configuration, was obtained with a 5:1:1 gas mixture at 56 kV, using flat gold and 50–60 percent reflecting Ge mirrors, as illustrated in FIG. 1, with 5 m radii of curvature. In addition to the above-mentioned tests, oscilloscope traces were made of the voltage, main current, trigger current, and laser pulse shape to further verify the advance provided by the invention.

It has thus been shown that the present invention provides a means for reliably and efficiently obtaining high energy laser pulses from a transversely-excited, high presure ( ≥ 1 atm) gas laser system using double electrical discharge optical pumping which incorporates a Marx bank (capacitor discharge) as a voltage source and electronic circuitry for time-shaping the voltage pulse across the anode and cathode of the laser as well as applying the voltage to the cathode-trigger independently from the cathode-anode circuit, thus comprising a substantial advance over the prior known systems using a low inductance pulse transformer electronic system.

While particular embodiments of the invention have been illustrated and described, modifications will become apparent to those skilled in the art, and it is intended to cover in the appended claims all such modifications as come within the spirit and scope of the invention.

What we claim is:

1. In a double-discharge laser system including vessel means for containing a gaseous lasing media and within which are positioned electrode means consisting of cathode means, trigger electrode means, and anode means for exciting the media to a lasing state, the improvement comprising: a capacitor discharge power supply means operatively connected to said electrode means for impressing electrical discharges thereacross, and electronic circuitry operatively interconnected between said power supply means and said electrode means for time-shaping the discharge across said cathode means and said anode means and/or for independently applying voltage between said cathode means and said trigger electrode means, and between said cathode means and said anode means, said electronic circuitry including cathode lead means electrically interconnecting said power supply means and said cathode means through inductor means, trigger electrode lead means electrically connecting said trigger electrode means to ground through a first capacitor means, anode lead means operatively connecting said anode means to ground, means for electrically connecting said power supply means to ground, and second capacitor means electrically connected on one side thereof to said cathode lead means intermediate said inductor means and said cathode means and on the other side thereof to ground.

2. The laser system defined in claim 1, wherein said capacitor discharge power supply means comprises at least a plurality of capacitors, a high voltage means for charging said capacitors, resistor means electrically connected intermediate said capacitors and said high voltage means, resistor means electrically connected intermediate said capacitors and ground, and trigger means electrically connected to said capacitors for switching energy stored in said capacitors to said electrode means.

3. The laser system defined in claim 2, wherein said trigger means comprises a plurality of spark gap assemblies, each one of which being operatively connected to an associated one of said plurality of capacitors.

4. The laser system defined in claim 1, wherein said capacitor discharge power supply means comprises a single capacitor electrically connected to a high voltage means for charging same, resistor means electrically connected intermediate one side of said capacitor and said high voltage means, means electrically connecting another side of said capacitor to ground, and trigger means electrically connected to said capacitor for switching energy stored therein to said electrode means.

5. The laser system defined in claim 1, additionally including resistor means electrically connected on one side thereof to said cathode lead means intermediate said power supply means and said inductor means and on the other side thereof to ground.

6. The laser system defined in claim 1, additionally including a third capacitor means electrically connected to said anode lead means intermediate said anode means and ground, and resistor means electrically connected on one side thereof to said anode lead means intermediate said anode means and said third capacitor means and on the other side thereof to ground.

7. The laser system defined in claim 1, wherein said cathode means comprises a plurality of cathode strips supported in spaced relationship and having the upper surface of each of said spaced strips in alignment, wherein said trigger electrode means comprises a plurality of trigger electrodes each positioned intermediate a pair of said cathode strips and in alignment with said upper surface of said cathode strips, and wherein said anode means comprises a plate-like member mounted above and in spaced relation with respect to said cathode strips and said trigger electrodes.

8. The laser system defined in claim 7, wherein said cathode strips each comprises a longitudinally extending body portion and curved end portions, wherein said trigger electrodes each comprises a wire-like member surrounded by a tube-like means, said plurality of trigger electrodes extending outwardly through said vessel means and each of said wire-like members being electrically connected to a bus bar means.

* * * * *